US012047735B2

(12) United States Patent
Orth et al.

(10) Patent No.: US 12,047,735 B2
(45) Date of Patent: Jul. 23, 2024

(54) LOUDSPEAKER SYSTEM, METHOD AND APPARATUS FOR ABSORBING LOUDSPEAKER ACOUSTIC RESONANCES

(71) Applicant: Polk Audio, LLC, Carlsbad, CA (US)

(72) Inventors: Scott Orth, Laurel, MD (US); Jens-Peter B Axelsson, Westminster, MD (US)

(73) Assignee: Polk Audio, LLC, Carlsbad, CA (US)

( * ) Notice: Subject to any disclaimer, the term of this patent is extended or adjusted under 35 U.S.C. 154(b) by 0 days.

(21) Appl. No.: 17/605,526

(22) PCT Filed: Apr. 21, 2020

(86) PCT No.: PCT/US2020/029109
§ 371 (c)(1),
(2) Date: Oct. 21, 2021

(87) PCT Pub. No.: WO2020/219441
PCT Pub. Date: Oct. 29, 2020

(65) Prior Publication Data

US 2022/0210544 A1 Jun. 30, 2022

Related U.S. Application Data

(60) Provisional application No. 62/837,561, filed on Apr. 23, 2019.

(51) Int. Cl.
*H04R 1/28* (2006.01)
*H04R 1/02* (2006.01)

(52) U.S. Cl.
CPC ........... *H04R 1/2826* (2013.01); *H04R 1/025* (2013.01)

(58) Field of Classification Search
CPC .... H04R 1/2826; H04R 1/025; H04R 1/2815; H04R 1/2823; H04R 1/2819;
(Continued)

(56) References Cited

U.S. PATENT DOCUMENTS 4,126,204 A * 11/1978 Ogi ...................... H04R 1/2826 181/156
4,146,744 A * 3/1979 Veranth ................ H04R 1/2819 181/146
(Continued)

FOREIGN PATENT DOCUMENTS

CN 204180257 U 2/2015
CN 105245983 A 1/2016
(Continued)

OTHER PUBLICATIONS

PCT International Search Report for PCT/US20/29109 dated Jul. 30, 2020, pp. 1-2.
(Continued)

*Primary Examiner* — Ahmad F. Matar
*Assistant Examiner* — Sabrina Diaz
(74) *Attorney, Agent, or Firm* — J. Andrew McKinney, Jr.; McKinney & Associates, LLC

(57) ABSTRACT

A loudspeaker system (700 or 800) and method for tuning ported loudspeakers and reducing unwanted acoustic resonances provides reduced port noise, eliminates undesired port resonances and improves the accuracy and fidelity of reproduced sound in a loudspeaker system of relatively high efficiency with an enclosure including an Eigen Tone Filter structure ("ETF") comprising a pipe or set of pipes 720, 820 placed inside a loudspeaker vent to absorb the "open pipe" acoustic resonance of the vent. The open-pipe resonance is unwanted and interferes with the midrange performance of the loudspeaker, when in use, if not corrected.

20 Claims, 14 Drawing Sheets

(58) Field of Classification Search
CPC .. H04R 1/2803; H04R 1/2811; H04R 1/2834; H04R 1/22; H04R 1/2669; H04R 1/2807; H04R 1/28; H04R 1/2849; H04R 1/2846
USPC ................................ 381/349, 345, 337, 354
See application file for complete search history.

(56) References Cited

U.S. PATENT DOCUMENTS 5,010,977 A * 4/1991 Furukawa .............. G10K 11/04 181/150
5,012,890 A * 5/1991 Nagi .................... H04R 1/2826 381/353
5,109,422 A * 4/1992 Furukawa .............. H04R 1/023 381/353
5,406,637 A * 4/1995 Gonzalez ............. H04R 1/2826 381/349
5,517,573 A 5/1996 Polk et al.
5,696,357 A * 12/1997 Starobin .............. H04R 1/2819 181/156
5,809,154 A 9/1998 Polk
6,275,597 B1 * 8/2001 Roozen ................ H04R 1/2826 381/345
7,039,212 B2 5/2006 Poling et al.
7,162,049 B2 1/2007 Polk
7,184,556 B1 2/2007 Johnson et al.
2004/0131219 A1 7/2004 Polk
2007/0129774 A1 11/2007 Yamada
2016/0249131 A1 8/2016 Oclee-Brown

FOREIGN PATENT DOCUMENTS

DE 20309771 U1 * 9/2003 ........... H04R 1/2826
EP 1453347 A1 * 9/2004 ........... H04R 1/2826
WO WO20070129774 11/2007

OTHER PUBLICATIONS

PCT International Preliminary Report on Patentability for PCT/US20/29109 dated Sep. 28, 2021, pp. 1-6.
Office Action from Chinese Patent Office for application 2020800380644 dated Dec. 6, 2023, pp. 1-9.

* cited by examiner

LOUDSPEAKER SYSTEM, METHOD AND APPARATUS FOR ABSORBING LOUDSPEAKER ACOUSTIC RESONANCES

PRIORITY CLAIM AND REFERENCE TO RELATED APPLICATIONS

This application claims priority to and benefit of (a) U.S. Provisional Application No. 62/837561 (filed Apr. 23, 2019) and (b) U.S. PCT Application PCT/US20/29109 (filed Apr. 21, 2020) both by Scott D. ORTH and Jens-Peter B. ("JP") AXELSSON and entitled "Loudspeaker System, Method and Apparatus For Absorbing Loudspeaker Acoustic Resonances" the entire disclosures of which are incorporated herein by reference.

BACKGROUND OF THE INVENTION

Field of the Invention

The present invention relates to reproduction of sound and more specifically to the application of certain acoustic principles in the design of a loudspeaker system.

Discussion of the Prior Art

Vented box loudspeaker systems have been popular for at least 70 years as a means of obtaining greater low frequency efficiency from a given cabinet volume. Significant advances were made in understanding and analyzing vented loudspeaker systems through the work of Thiele and Small during the 1970's. Since then, readily available computer programs have made it possible to easily optimize vented loudspeaker designs. However, practical considerations often prevent these designs, optimized in theory, from being realized in actuality or from functioning as intended.

There are two basic approaches in common use in connection with vented loudspeaker systems, these being the ducted port (e.g., as illustrated in FIG. 1A) and the passive radiator. Although the passive radiator approach has some advantages, the ducted port has been, in general, more popular due to lower cost, ease of implementation and generally requiring less space.

There are, however, disadvantages to the ducted port approach. These relate principally to undesirable noise and attendant losses which may be generated by the port at the higher volume of air movement required to produce higher low frequency sound pressure levels. For example, as is well known to those skilled in the art, a vented loudspeaker system has a specific tuning frequency, $f_P$, determined by the volume of air in the enclosure (e.g., 100), the acoustic mass of air provided by the port, and the compliance of the air in the enclosure. In general, a lower tuning frequency $f_P$ is desirable for higher performance loudspeaker systems. In accordance with the prior art (as set forth in commonly owned U.S. Pat. No. 7,162,049) either greater acoustic mass in the port or greater compliance resulting from a larger enclosure volume is required to achieve that lower tuning frequency $f_P$. The acoustic mass of a port is directly related to the mass of air contained within the port but inversely related to the cross-sectional area of the port. This suggests that to achieve a lower tuning frequency $f_P$, a longer port with smaller cross-sectional area should be used. However a small cross-section is in conflict with the larger volumes of air required to reproduce higher sound pressure levels at lower frequencies. For example, if the diameter of a port is too small or is otherwise improperly designed, non-linear behavior such as chuffing or port-noise due to air turbulence can result in audible distortions and loss of efficiency at low frequencies particularly at higher levels of operation. In addition, viscous drag from air movement in the port can result in additional loss of efficiency at lower frequencies. Increasing the cross-sectional area of a port can reduce turbulence and loss but the length of the port must be increased proportionally to maintain the proper acoustic mass for a given tuning frequency. The required increase in length, however, may be impractical to implement.

Other difficulties may also arise as the length of the port and cross-section are increased. Organ pipe resonances occur in open-ended ducts at a frequency which is inversely proportional to the length of the duct. These organ pipe resonances may produce easily audible distortion when they occur within certain ranges of frequencies. For example a duct nine inches in length will have a highly audible principle resonance at approximately 700 Hz while a duct only 3 inches in length would have a much less audible principle resonance at approximately 2,100 Hz. In fact, a typical strategy employed in the design of vented loudspeaker systems is the use of shorter ports such that the organ pipe resonances occur at higher frequencies where they are less audible and less likely to be within the range of the transducers mounted in the enclosure. In addition, a larger cross-sectional area may lead to undesirable transmission of mid-range frequencies generated inside the enclosure to the outside of the enclosure. This may also lead to audible distortion in the form of frequency response variations due to interference with the direct sound produced by the loudspeaker system.

Therefore, the design of ports for vented loudspeaker systems involves conflicting requirements. A large cross-sectional area is required to avoid audible noise and losses due to non-linear turbulent flow but this makes it difficult to achieve the acoustic mass required for a low tuning frequency within practical size constraints. As will be familiar to those skilled in the art, various methods have been employed to construct ports with reduced turbulence and loss. Returning to the example shown in FIG. 1A, a cross-sectional view of loudspeaker enclosure 100 includes a transducer 102 and a port 104 that is flared at one or both ends of the port in order to reduce turbulence. The flared port 104 operates to reduce turbulence by increasing the cross-sectional area of the port at one or both ends thereby slowing the particle velocity of air at the exits. This allows for a smaller cross-section in the middle section of the port and a higher acoustic mass for a given length. However, in order to be effective, the required flared ends 106, 108 may be quite large and may, themselves, add significantly to the overall port length without significantly contributing to the acoustic mass. The increased cross-section of the flare may increase the transmission of undesirable midrange frequencies from inside the loudspeaker cabinet and an improperly selected rate of flare may actually increase turbulence.

Another conventional method used to decrease turbulence and loss is shown in FIG. 1B, which is a cross-sectional view of a loudspeaker enclosure 200 with a transducer 102 and multiple ports 204 and 206. Using multiple ports 204 and 206 decreases turbulence and loss by taking advantage of the combined cross-sectional area of several ports. However, as with a single port, the length of each of the multiple ports must be increased to account for the greater total cross-section. For example, if two identical ports are used, they will both need to be approximately twice as long as a single port of the same cross-section to achieve the same acoustic mass and tuning frequency. As discussed above this may lead to impractical length requirements and more audible organ pipe resonances.

Other techniques are also used to reduce turbulence and loss as well as the other difficulties associated with the design of ports as previously discussed. These include ports with rounded or flanged ends, geometries to reduce organ pipe resonances and a plethora of methods for implementing longer ports through folding or other convolutions.

Commonly owned U.S. Pat. Nos. 5,517,573 and 5,809, 154, incorporated herein in their entireties by reference, disclose improved porting methods for achieving the required acoustic mass in a compact space with reduced turbulence and loss. FIG. 1C is a reproduction of FIG. 7 from the '573 patent. The method described in these patents involves the use of a disk at the end or ends of a simple duct to effectively create an increasing cross-sectional area at the ends of the port. In some preferred embodiments flow guides are also used to further improve the efficiency of the port structure. This method has the advantages of suppressing transmission of midrange frequencies from inside the cabinet and of providing the required acoustic mass in a more compact form which also reduces turbulence and loss, but can, in certain configurations, create problems relating to audible organ pipe resonances, and these challenges were addressed in other ported cabinet configurations illustrated in FIGS. 1C, 1D and 1F, which are taken from commonly owned U.S. Pat. No. 7,162,049 (also incorporated herein by reference).

The vented loudspeakers of FIGS. 1A-1F were developed to provide increased output above their low frequency tuning frequency. One downside of these vented designs is that the vent has acoustic resonances well above the desired primary Helmholtz resonance associated with the low frequency system. These resonances are often audible and affect the frequency and time resonance of the system in the midrange. Eliminating or reducing the amplitude of these would improve the midrange performance of the system. There is also a desire for reducing the audibility of port noise. The prior methods and structures and methods for reducing these problems, such as reducing the cross-sectional area of the port, lead to side effects such as increased air velocity which increases turbulence (and port noise). Electrical correction of port noise or chuffing is not possible since the vent is not driven directly by the associated electronics, but through the transducer in the system.

There is a need, therefore, for a more effective system and method for tuning ported loudspeakers and reducing unwanted acoustic resonances while providing reduced port noise, eliminating undesired port resonances and improving the accuracy and fidelity of reproduced sound in a loudspeaker system of relatively high efficiency.

OBJECTS AND SUMMARY OF THE INVENTION

In accordance with the present invention, a more effective system and method for tuning ported loudspeakers and reducing unwanted acoustic resonances provides reduced port noise, eliminates undesired port resonances and improves the accuracy and fidelity of reproduced sound in a loudspeaker system of relatively high efficiency.

The loudspeaker system and enclosure of the present invention includes vent defining a lumen providing fluid communication between the enclosure's interior volume and the external ambient environment where the vent's lumen includes an Eigen Tone Filter ("ETF") pipe or set of pipes placed inside the vent to absorb the "open pipe" acoustic resonance of the vent. This open pipe acoustic resonance is typically unwanted and interferes with or diminishes the midrange performance of the loudspeaker.

This ETF equipped loudspeaker system and enclosure of the present invention has several advantages, including: (a) the ETF system ("ETF") is passive and so the system requires no electricity or Digital Signal Processing ("DSP") to work; (b) the ETF system is relatively inexpensive, being made of a few simple parts; (c) the ETF system absorbers can be tuned to absorb vent resonances, cabinet resonances or both; (d) when using a dual pipe ETF system, individual absorbers can be tuned separately to deal with different resonances; (e) the ETF system is visible from the outside of the loudspeaker enclosure and so the system has marketing advantages compared to an internal solution; and (f) an ETF equipped loudspeaker system and enclosure has reduced audible port noise, when in use.

The ETF equipped loudspeaker system and enclosure was developed after observing that a column of air that is open at both ends will have acoustic resonances whose wavelength is twice that of the length of the column plus some amount allowing for end corrections. Similarly, a column closed at one end will have a resonance whose wavelength is four times that of the column plus end correction. By placing the open end of a closed column of roughly half the length near the center of an open-ended column, it was observed that the closed column will act as an absorber at the frequency of the resonance of the open-ended column.

During applicant's prototype development work, it was noted that one may also place two of these closed-end columns face to face, with their openings near the center of the open-ended column. The advantages of this configuration were observed to be numerous. One, it allows for more absorption as the two columns have more surface area than one column. Two, the columns can be placed concentrically such that flow in the primary column is less disturbed by changes in cross section area. And three, the absorbing columns can be more easily located in the primary column since they can then be mounted to features at the ends or outside the main column. It was also noted that tapering the ends of the close columns reduced the quality (Q) of the absorbers which allows tuning the ETF absorbers to better match the quality of resonances in the main column. The taper in prototypes were also observed to reduce turbulence in the main column at the ends since they are more aerodynamic. In other prototypes, foam, fiber and other acoustic resistance elements were configured and inserted in the absorbers to alter or affect the quality (Q) as well. These acoustic resistance elements were observed to work well at the closed (i.e., bottom) end, but better overall performance was obtained with absorbers placed at the opening, a configuration which also provided the easiest tuning method providing better performance with the le'ast amount of unwanted side effects.

The ETF equipped loudspeaker system and enclosure of the present invention was prototyped in round vents for loudspeakers, but the principles and method of the present invention may be adapted to work in vents of other shapes. The absorbers also do not have to be round.

Two preferred embodiments were developed during prototyping. One is that of a typical bookshelf loudspeaker. The other is that of a floor standing (tower) loudspeaker equipped with a Power Port™ style vent configuration. In the case of the Power Port™ style vent configuration, the ETF absorber can be mounted in the diffuser part of the base to provide an attractive, effective and economical embodiment.

The end correction for an ETF absorber tends to be smaller than that of the primary column, so there should be a gap between the two absorbers, and, in the case of the Power Port™ style vent configuration, the primary column extends past the simple tube portion, the absorber assembly tends to be longer than the assembly for the primary column. This allows for the ETF absorber assembly to be mounted conveniently to the flare at the ends of the main column or external to the main column.

The opening between the two ETF absorbers influences the efficiency of the absorbers. If the opening is too small, the effectiveness of the absorbers diminishes. A diameter to length ratio of 1 to 1.25 is preferred (i.e. the diameter of the ETF absorber tube ID to the length of gap between them, e.g., where diameter of absorber=25 mm, gap between absorbers=20-25 mm).

The size of the absorbers influences the effectiveness of the absorbers. More cross-sectional area equates to better absorption. Since the absorbers subtract from the cross-sectional area of the main column, it is usual best to keep the absorbers as small as necessary to achieve the desire absorption. A ratio of 0.15 to 0.2 of absorber cross-sectional are to primary column cross-sectional are seems to work best.

The Helmholtz tuning of the main column (vent $f_P$) will change with the insertion of the absorber assembly since the cross-sectional area of the main column is reduced by the cross-sectional area of the absorber assembly. It is simple enough to increase the size of the main column to compensate.

It is possible to tune the absorbers to absorb frequencies that are not necessarily caused by the primary air column. For example, the resonances (modes) present in the loudspeaker cabinet frequently exit through the vent and can be absorbed by the ETF absorbers if tuned properly. This has been demonstrated in the prototypes.

The above and still further features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Figure 1A:
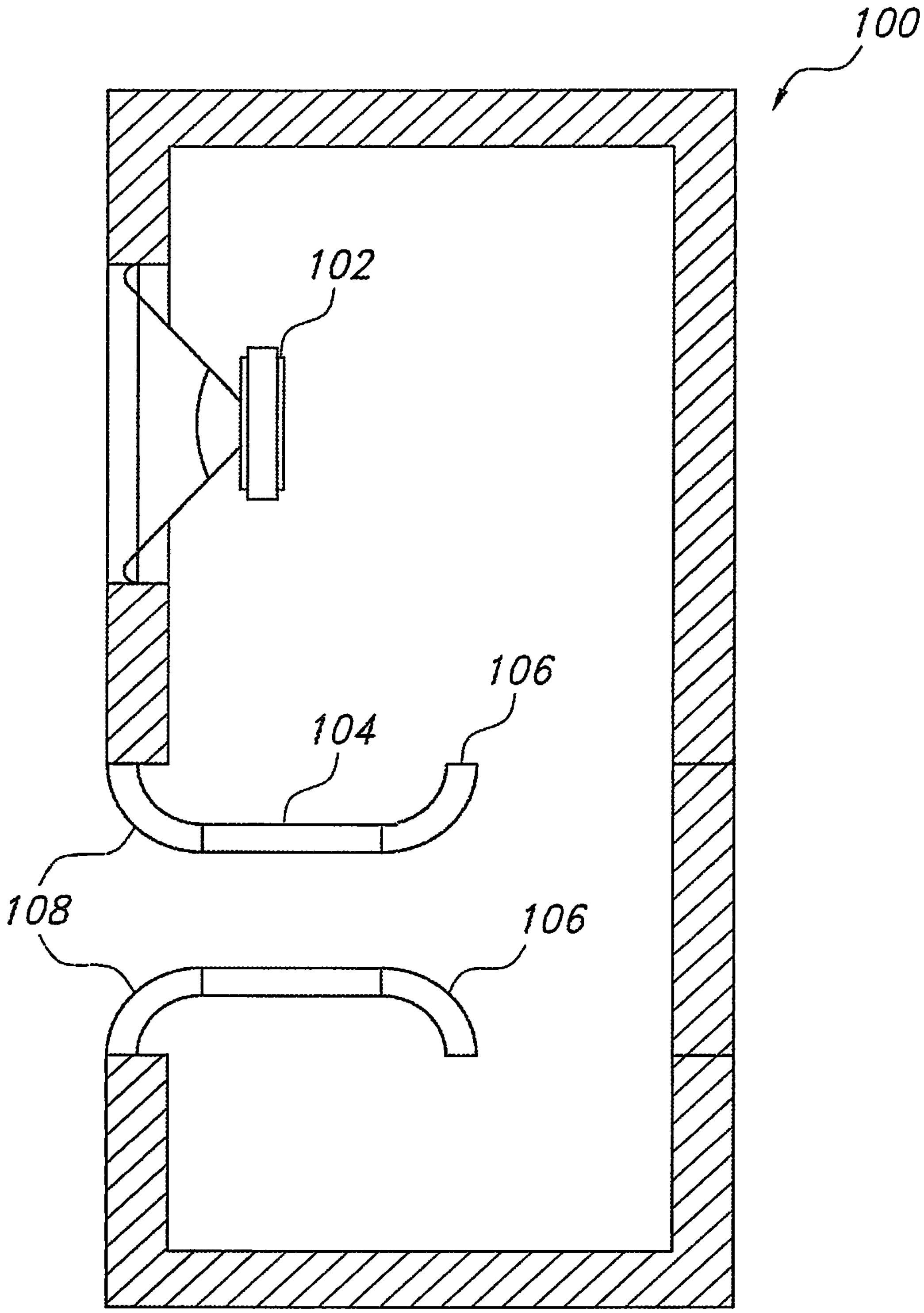
Prior Art FIG. 1A
FIGS. 1A-1F illustrate ported loudspeaker systems and methods, in accordance with the prior art.
Figure 1B:
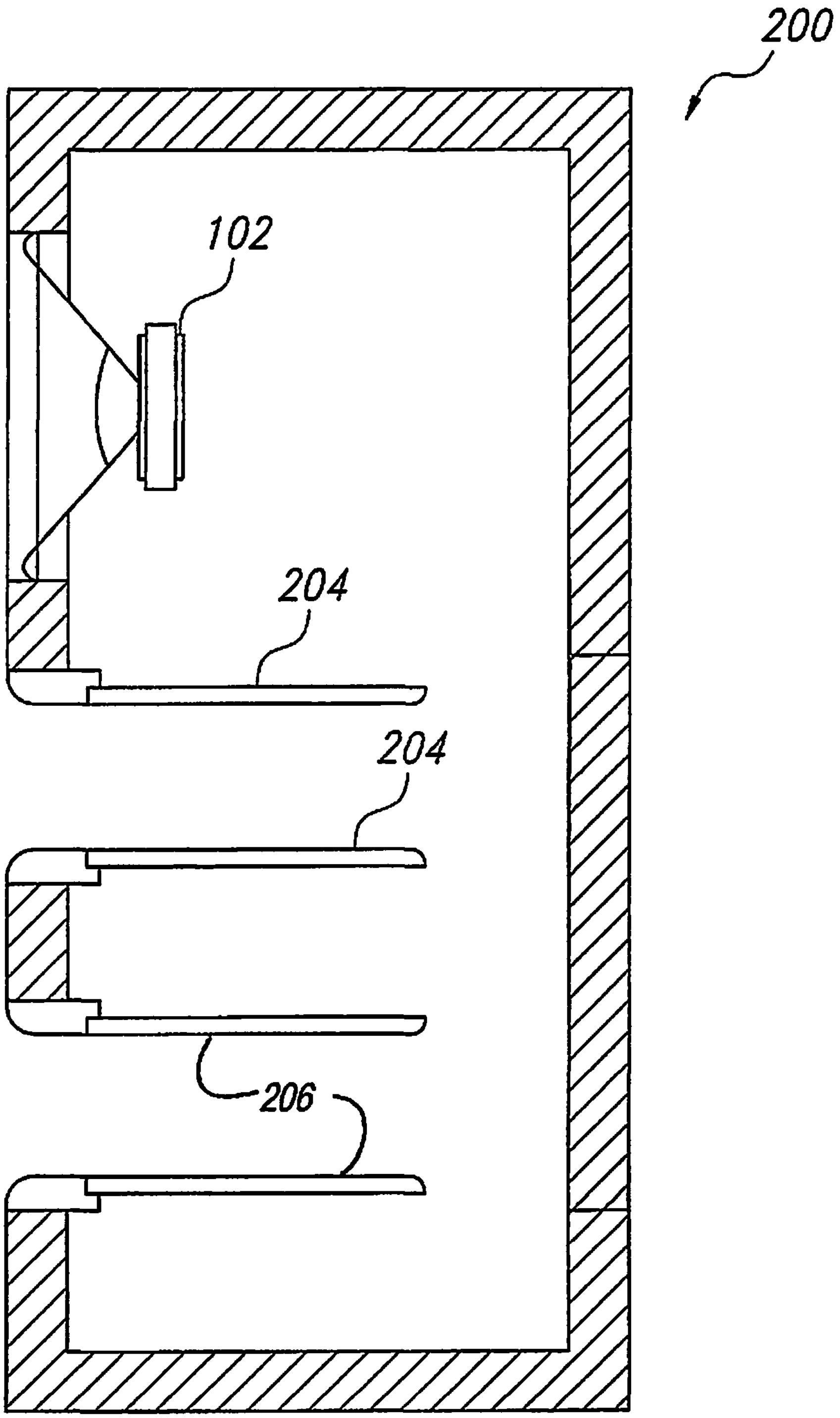
Prior Art FIG. 1B
Figure 1C:
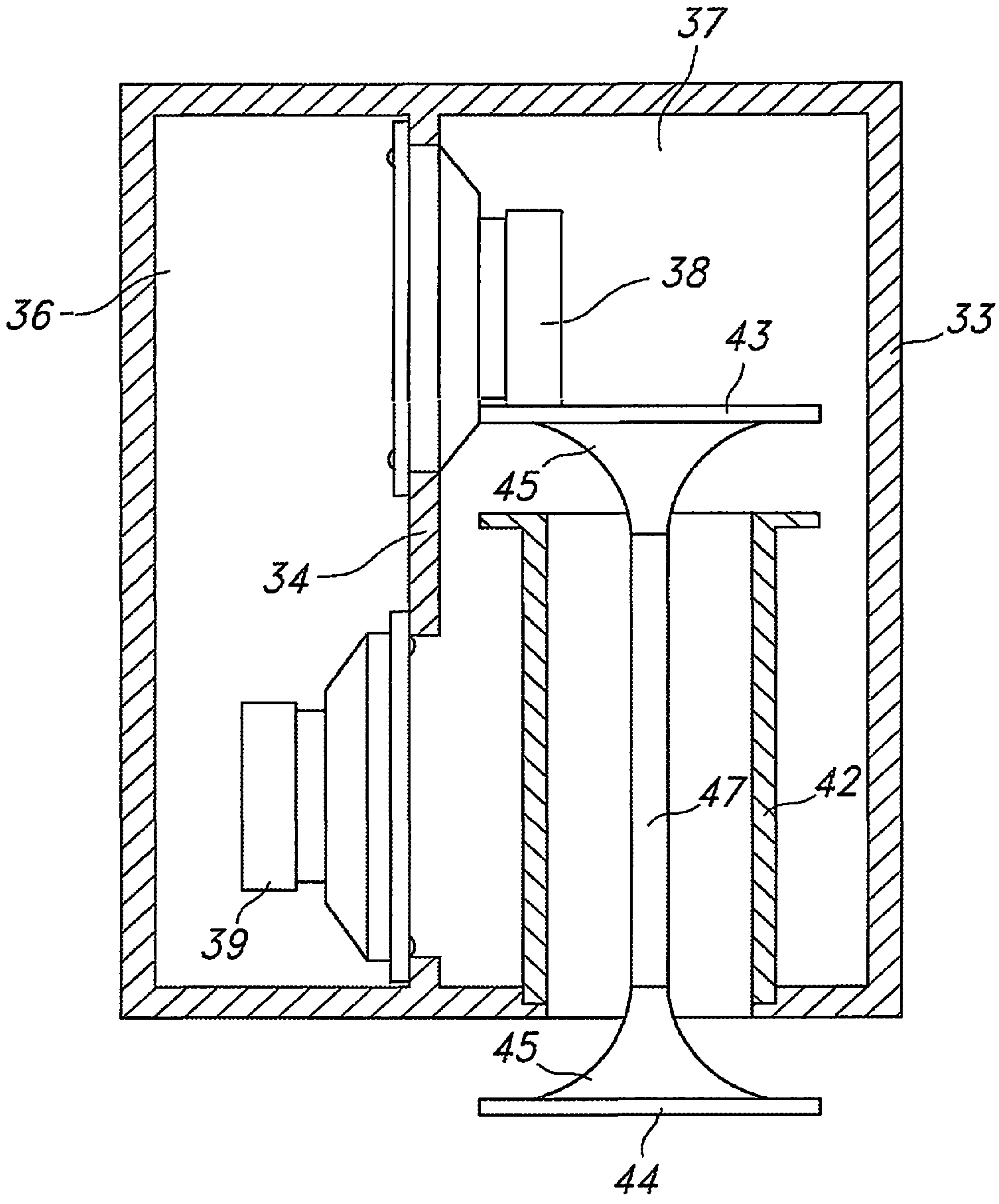
Prior Art FIG. 1C
Figure 1D:
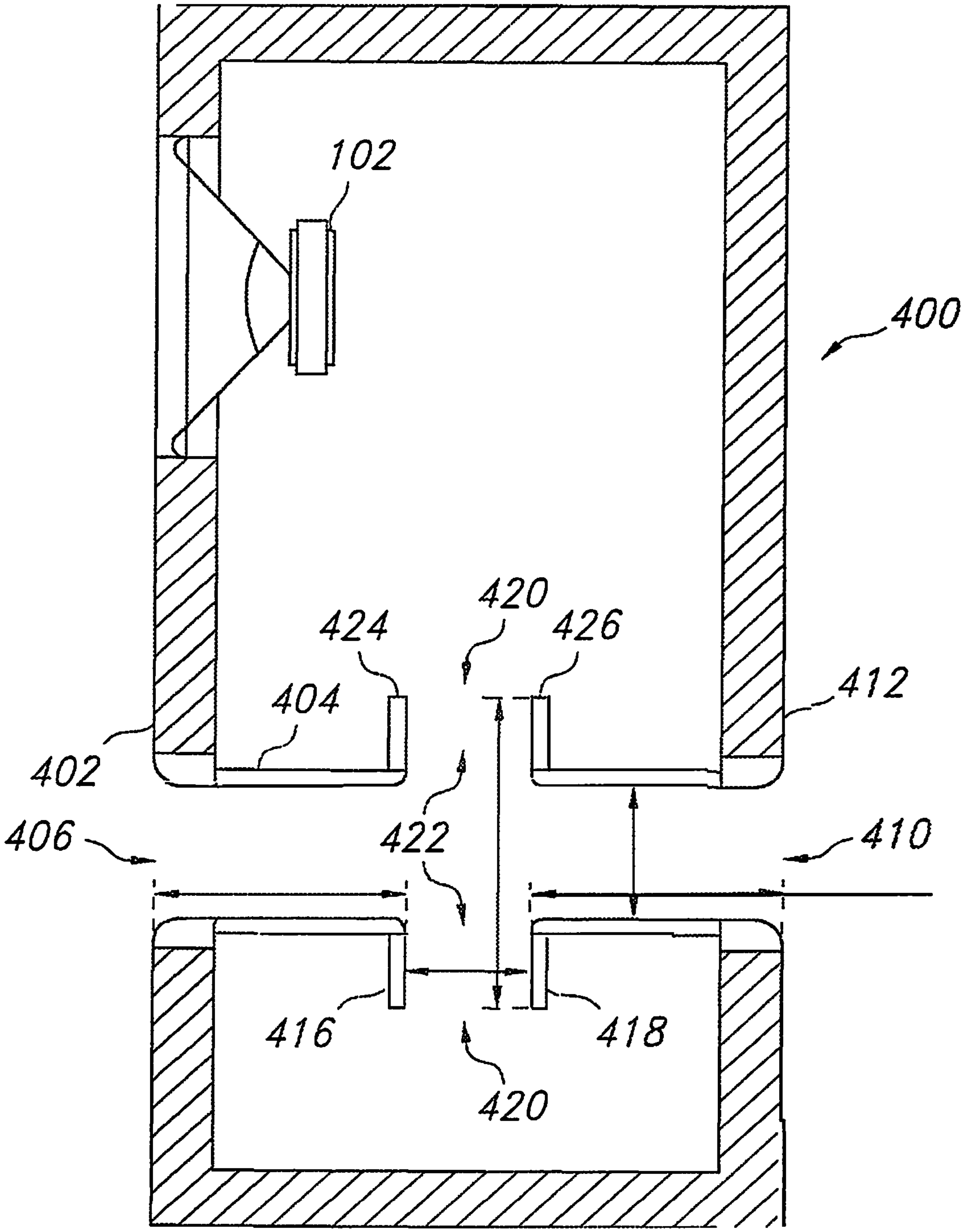
Prior Art FIG. 1D
Figure 1E:
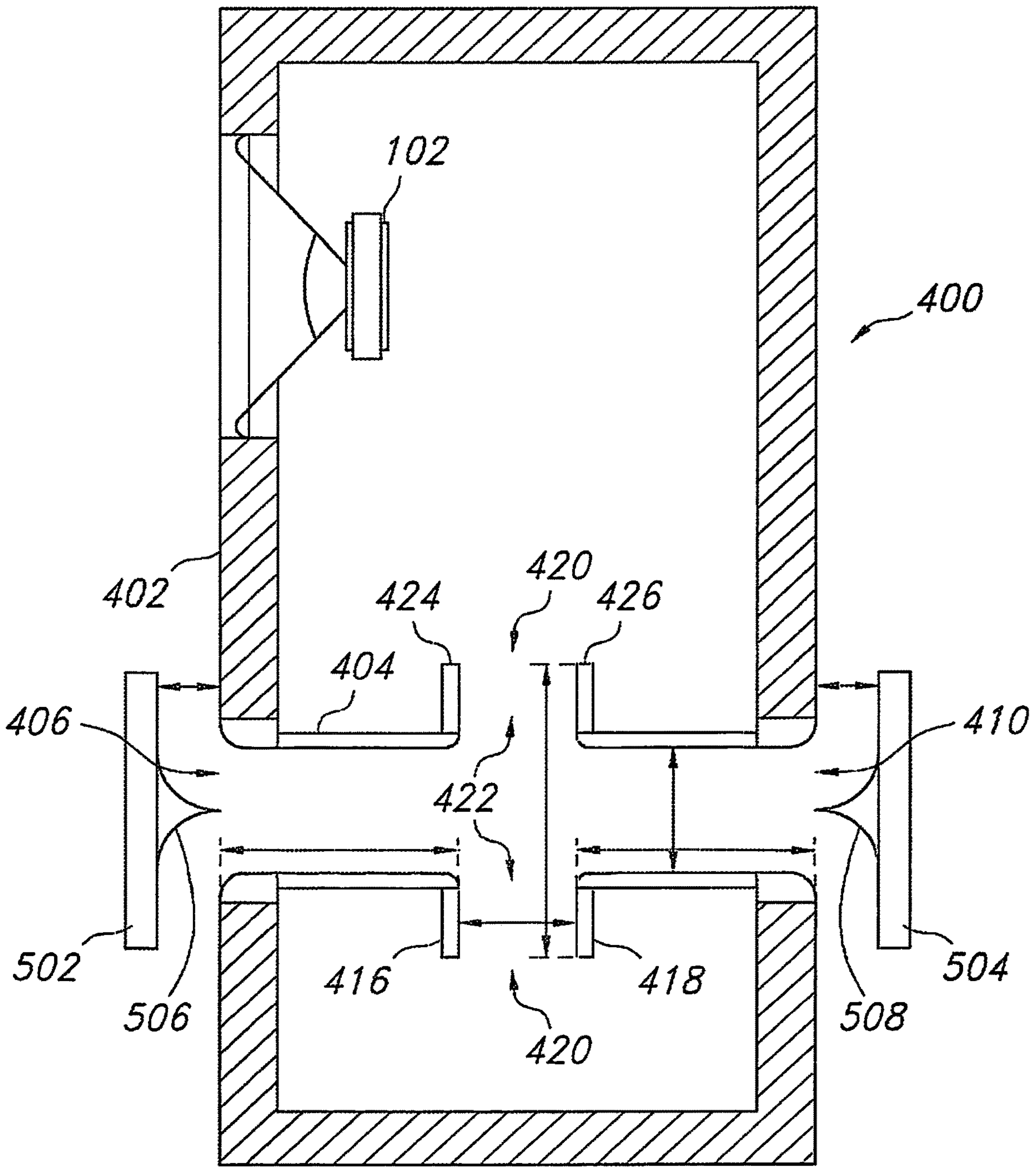
Prior Art FIG. 1E
Figure 1F:
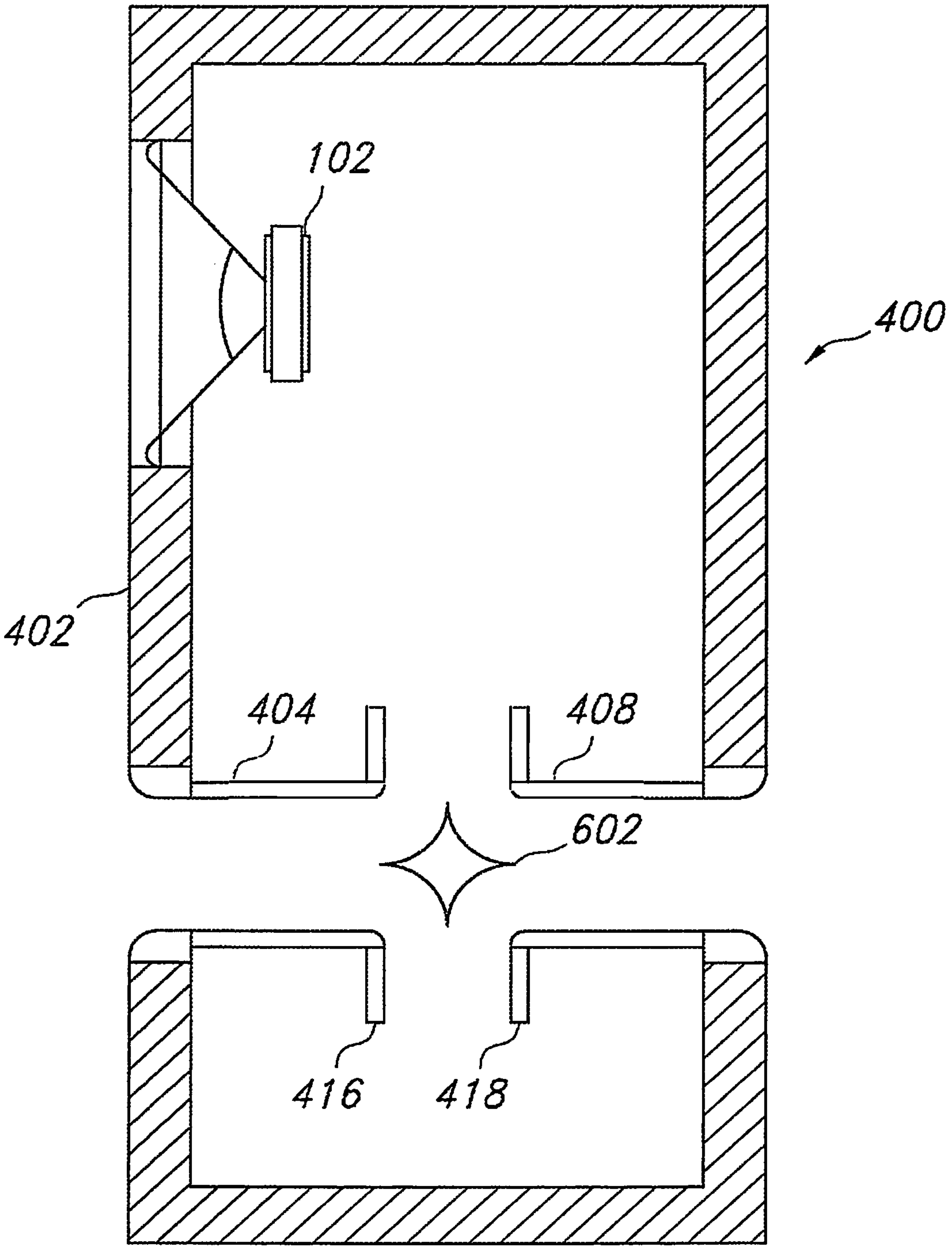
Prior Art FIG. 1F

Turning to FIGS. 2-9 and in accordance with the present invention, a more effective system and method for tuning ported loudspeakers and reducing unwanted acoustic resonances provides reduced port noise, eliminates undesired port resonances and improves the accuracy and fidelity of reproduced sound in a loudspeaker system of relatively high efficiency.

The ETF equipped loudspeaker system and enclosure of the present invention (e.g., 700 or 800) includes vent defining a lumen providing fluid communication between an enclosure's interior volume and the external ambient environment where the vent's open interior lumen includes an Eigen Tone Filter ("ETF") pipe or set of pipes placed inside the vent to absorb the "open pipe" acoustic resonance of the vent. This open pipe acoustic resonance is typically unwanted and interferes with or diminishes the midrange performance of the loudspeaker. As noted above, the ETF equipped loudspeaker system and enclosure of the present invention has several advantages over the prior art of FIGS. 1A-1F, including:

1) The ETF system (e.g., 720A, 720B or 820) is passive so requires no electricity or Digital Signal Processing ("DSP") to work;
2) The ETF system (e.g., 720A, 720B or 820) is relatively inexpensive, being made of a few simple parts;
3) The ETF system's absorber tubes can be dimensioned (i.e., "tuned") to absorb the vent resonances, cabinet resonances or both;
4) In the case of the dual pipe ETF system, individual absorbers can be tuned separately to deal with different resonances;
5) The ETF system is visible from the outside of the loudspeaker enclosure and so has marketing advantages compared to an internal solution; and
6) The ETF equipped loudspeaker system (e.g., 700, 800) and enclosure reduces audible port noise.

The ETF equipped loudspeaker system (e.g., 700, 800) was developed after observing that a column of air that is open at both ends will have acoustic resonances whose wavelength is twice that of the length of the column plus some amount allowing for end corrections. Similarly, a column closed at one end will have a resonance whose wavelength is four times that of the column plus end correction. By placing the open end of a closed column of roughly half the length near the center of an open-ended column, it was observed that the closed column will act as an absorber at the frequency of the resonance of the open-ended column.

During applicant's prototype development work, it was noted that one may also place two of these closed-end columns face to face, with their openings near the center of the open-ended column. The advantages of this configuration were observed to be numerous. One, it allows for more absorption as the two columns have more surface area than one column. Two, the columns can be placed concentrically such that flow in the primary column is less disturbed by changes in cross section area. And three, the absorbing columns can be more easily located in the primary column since they can then be mounted to features at the ends or outside the main column. It was also noted that tapering the ends of the close columns reduced the quality (Q) of the absorbers which allows tuning the ETF absorbers to better match the quality of resonances in the main column. The tapers in prototypes were also observed to reduce turbulence in the main column at the ends since they are more aerodynamic. In other prototypes, foam, fiber and other acoustic resistance elements were configured and inserted in the absorbers to alter or affect the quality (Q) as well. These acoustic resistance elements were observed to work well at the closed (i.e., bottom) end, but better overall performance was obtained with absorbers placed at the opening, a configuration which also provided the easiest tuning method providing better performance with the least amount of unwanted side effects. Alternatively, the acoustic resistance elements could be placed elsewhere in the absorber.

The ETF equipped loudspeaker system and enclosure of the present invention was were prototyped in round vents for loudspeakers, but the principles and method of the present invention may be adapted to work in vents of other shapes. The absorbers also do not have to be round.

Figure 2:
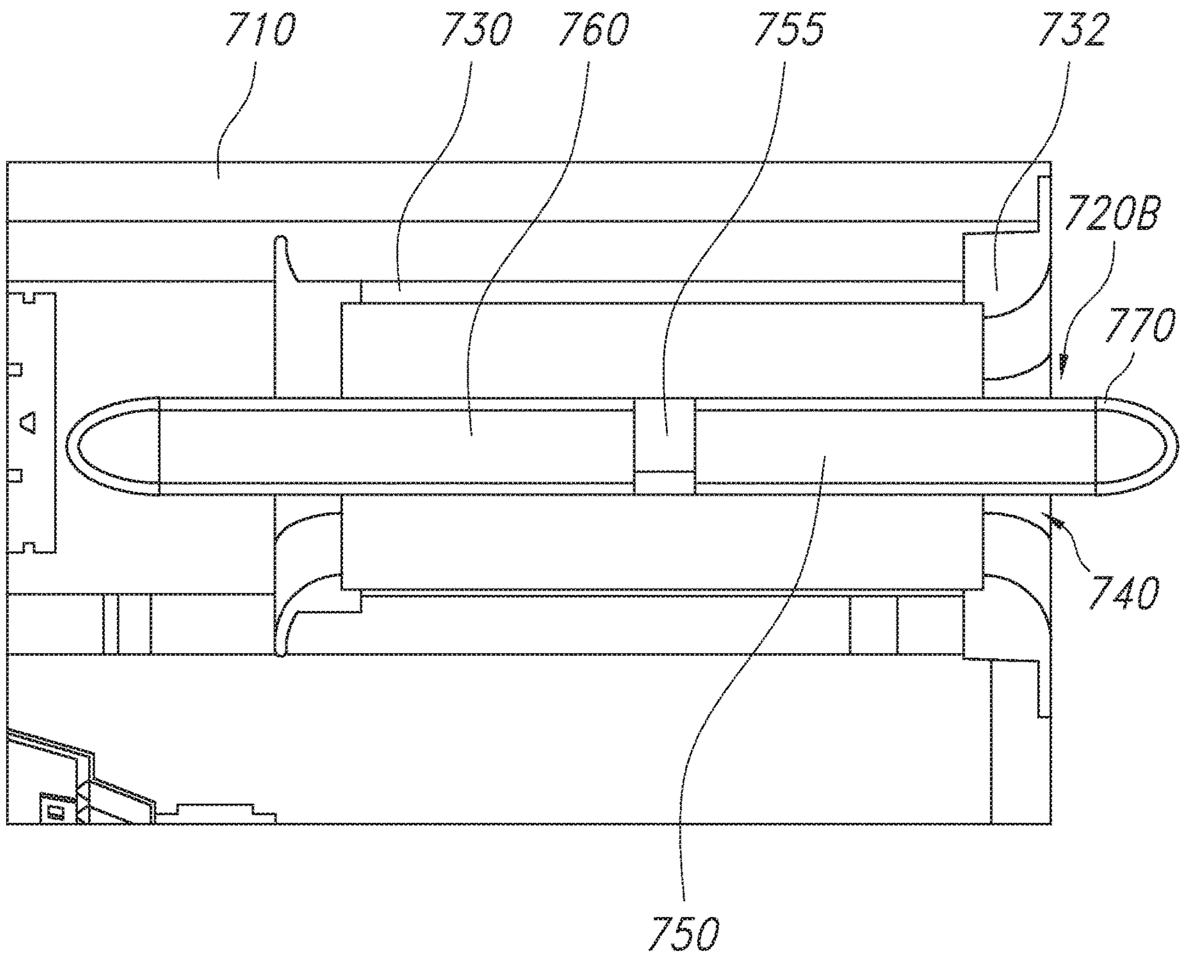
FIG. 2 is a cross sectional view, in elevation, of a non-power port segment of a bookshelf loudspeaker system showing the ETF equipped loudspeaker system vent or port within an enclosure, in accordance with the structure and method of the present invention.
Figure 5A:
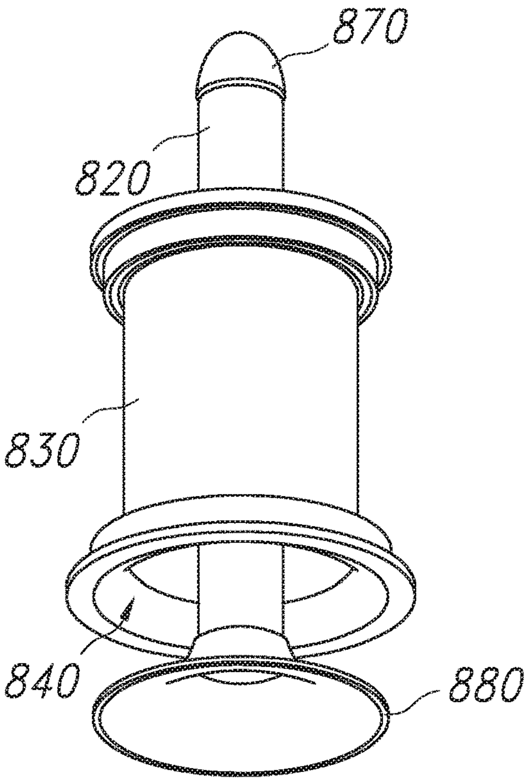
FIGS. 5A and 5B are perspective views of the ETF equipped Tower system vent or port of FIG. 3, in accordance with the structure and method of the present invention.
Figure 5B:
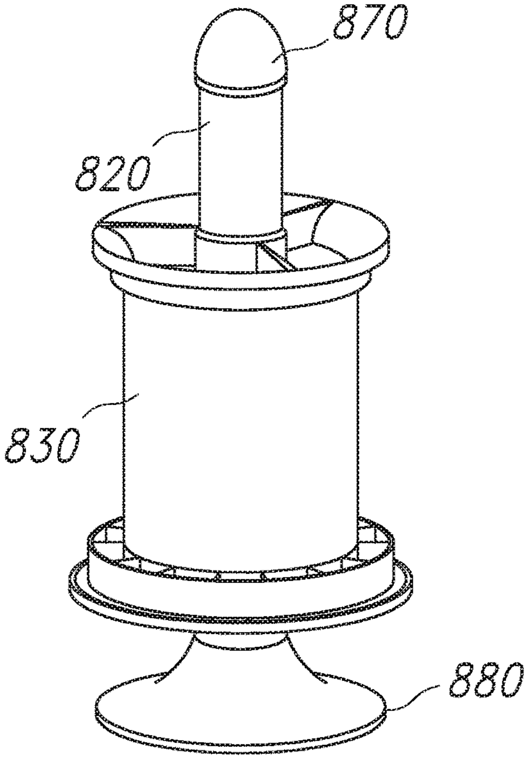
Figure 6:
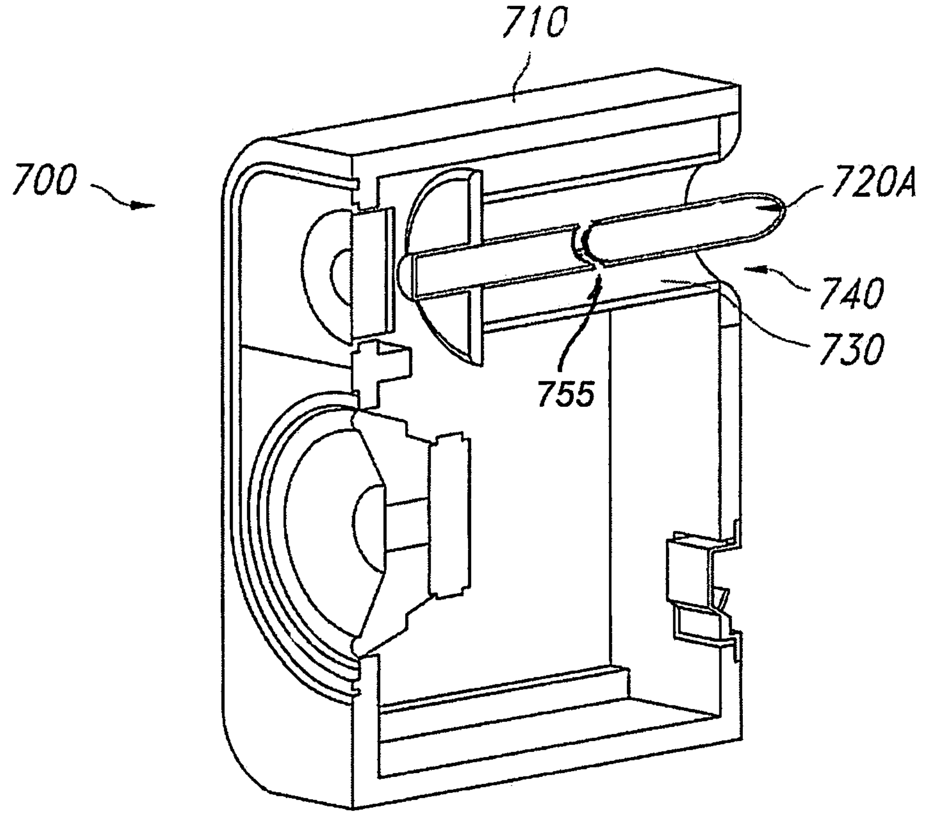
FIG. 6 is a cross sectional view, in perspective, of the bookshelf loudspeaker system incorporating the ETF configuration of FIGS. 2, 4A and 4B within an enclosure, in accordance with the structure and method of the present invention.

Two embodiments are shown in FIGS. 2-9. One is an ETF equipped bookshelf loudspeaker system 700 (as best seen in FIGS. 2 and 6). The other embodiment a floor standing (tower) loudspeaker system 800 with an ETF equipped Power Port (as best seen in FIGS. 3 and 8A-8C). In the case of the ETF equipped Power Port, the ETF absorber assembly 820 can be mounted in the diffuser part of the base. This is convenient and saves cost.

Figure 4A:
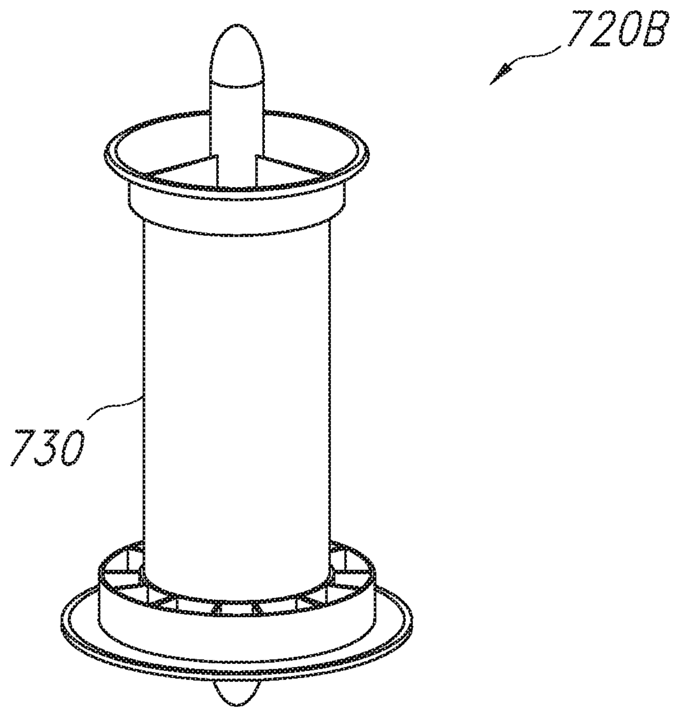
FIGS. 4A and 4B are perspective views of the ETF equipped Bookshelf system vent or port of FIG. 2, in accordance with the structure and method of the present invention.
Figure 4B:
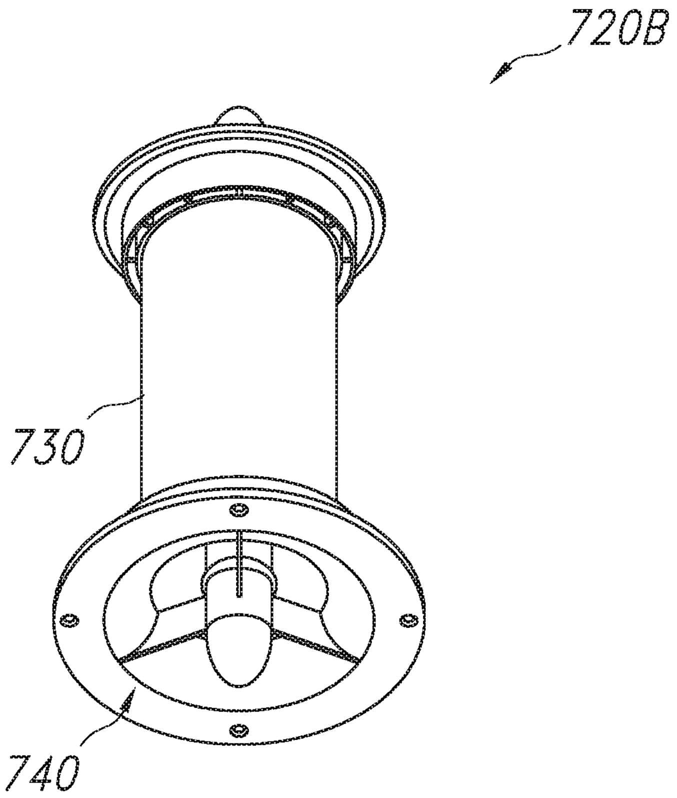

Referring again to FIGS. 2 and 6, and also to FIGS. 4A and 4B, a bookshelf-sized embodiment of the ETF equipped loudspeaker system of the present invention 700 includes a ported loudspeaker enclosure 710 having a front baffle which supports and aims at least one loudspeaker driver (e.g., a mid-woofer and a tweeter) and a rear baffle which supports ETF assembly (e.g., 720A). Ported loudspeaker enclosure 710 defines an interior volume ported to the ambient environment with a vent or port 730 which defines a cylindrical internal vent lumen 740 having a central vent lumen axis. ETF assembly 720A is supported in vent lumen 740 in coaxial alignment with the vent lumen axis and comprises a pipe or set of pipes or absorbers (750, 760) placed inside the loudspeaker vent lumen to absorb the "open pipe" acoustic resonance of the vent lumen 740 when the loudspeaker is in use. ETF assembly 720A (as seen in FIG. 6) has a proximal closed end opposite a distally, rearwardly projecting end cap and has, at its mid-point, a circumferential slot or sidewall gap which provides fluid communication between the interior volume of the first and second axially aligned ETF pipe segments or absorbers (750, 760) and the vent lumen 740. Since the vent or port 730 defines a tuned port which provides fluid communication between the interior of enclosure 710 and the ambient environment, it also provides fluid communication between each of those and the interior volume of the ETF absorbers for ETF Assembly 720A. FIGS. 2, 4A and 4B provide slightly different embodiments of the ETF assembly (e.g., 720B) for use with bookshelf system 700, in that both ends of the ETF pipe carry rounded or "bullet-nose" shaped end caps, preferably containing absorber elements (not shown). Referring back to FIG. 2, ETF assembly 720B has a proximal closed end cap opposite the distally, rearwardly projecting end cap and has, at its mid-point, a circumferential slot or sidewall gap which provides fluid communication between the interior volume of the first and second axially aligned ETF pipe segments or absorbers and the vent lumen 740. Each of the first and second axially aligned ETF pipe segments or absorbers (750, 760) preferably has an axial length that is approximately one quarter wavelength for the frequency of interest (e.g., 155 mm for 562 Hz and 122 mm for 789 Hz, which provides the change illustrated in FIG. 7).

Figure 7:
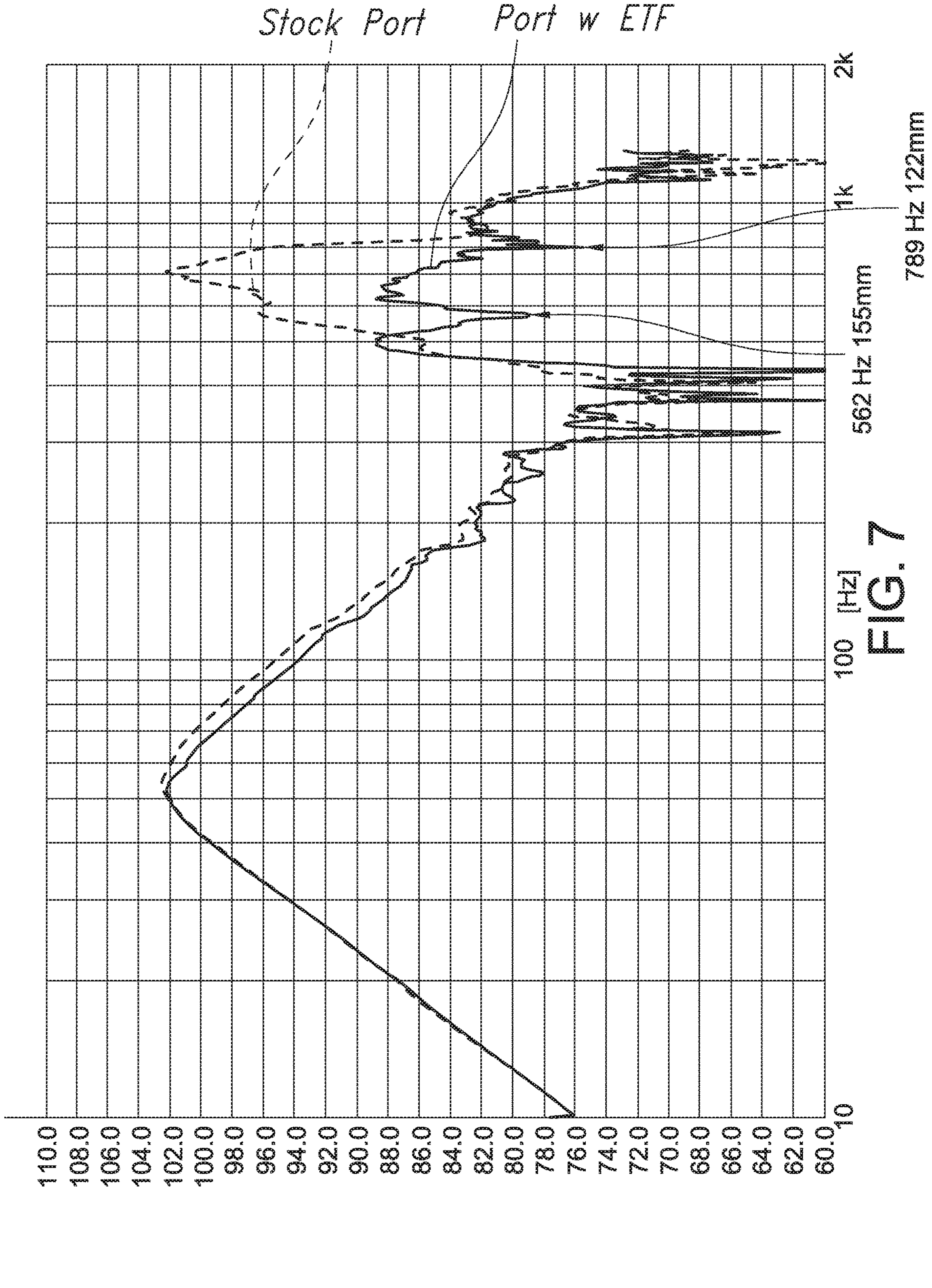
FIG. 7 is a frequency response plot illustrating the frequency responses for and performance of the stock (no ETF) and enhanced (Port with ETF) bookshelf loudspeaker system of FIG. 6, in accordance with the method of the present invention.

In the development method of the present invention, selecting the dimensions for (i.e., "tuning") the ETF pipes has been an iterative process. In the example of Bookshelf loudspeaker system 700, The "stock port" data plotted in FIG. 7 shows an undesirable amount of energy in the range of 550 Hz to 800 Hz. In order to reduce or "notch out" this undesired energy with Bookshelf speaker system ETF 720A, the ETF pipe segments need to be properly sized and configured (or "tuned"). A detailed example is provided below (for Tower system 800).

Figure 3:
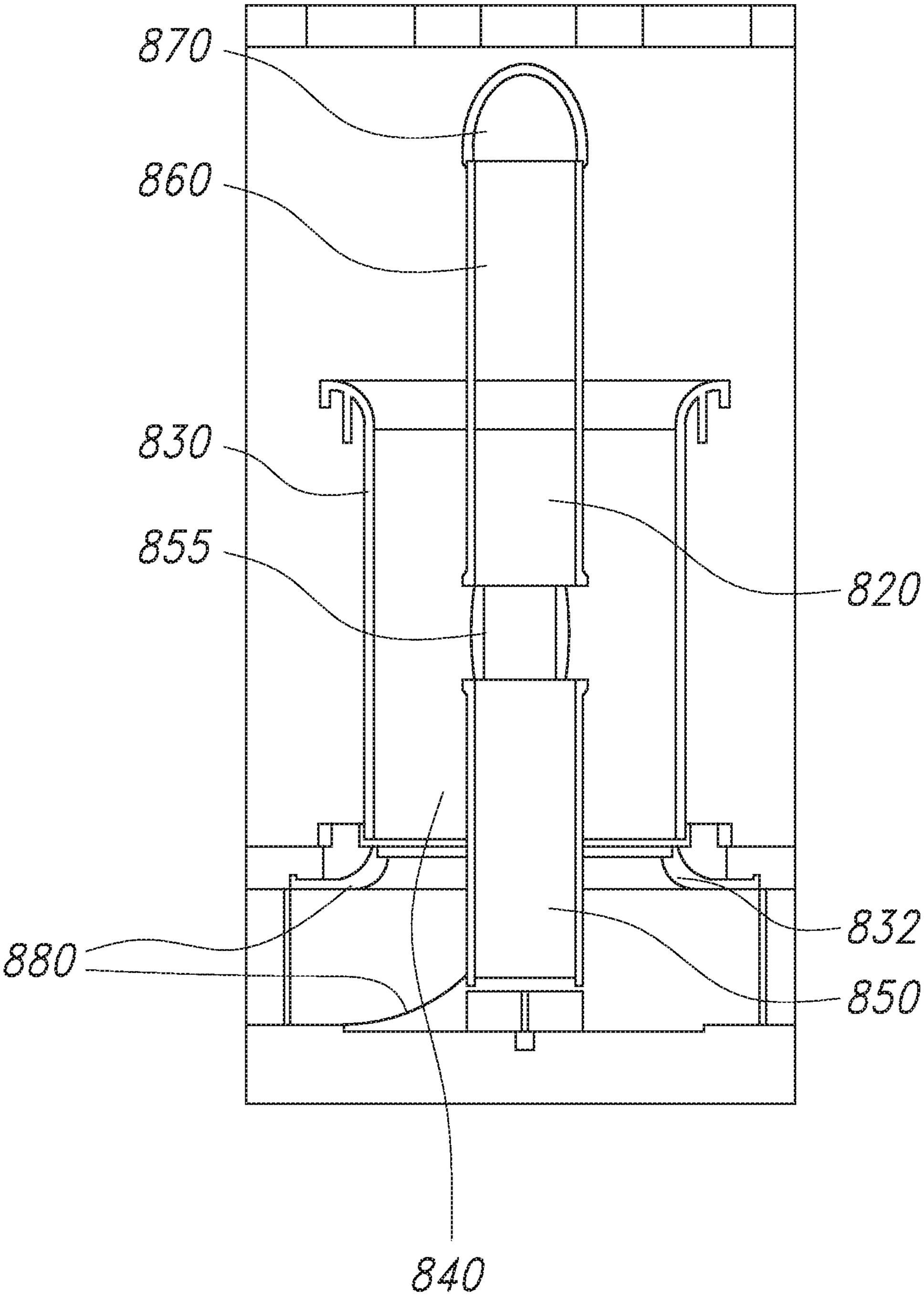
FIG. 3 is a cross sectional view, in elevation, of a port -equipped segment of a tower loudspeaker system showing the ETF equipped loudspeaker system vent or port within a tower enclosure, in accordance with the structure and method of the present invention.
Figure 8A:
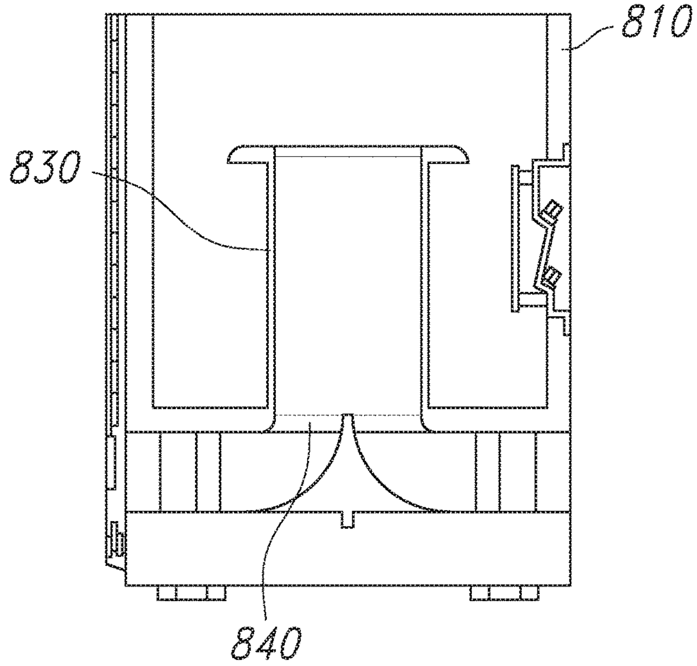
FIGS. 8A, 8B and 8C are cross sectional views in elevation of the ETF equipped Tower system vent or port of FIGS. 3, 5A and 5B in accordance with the structure and method of the present invention.
Figure 8B:
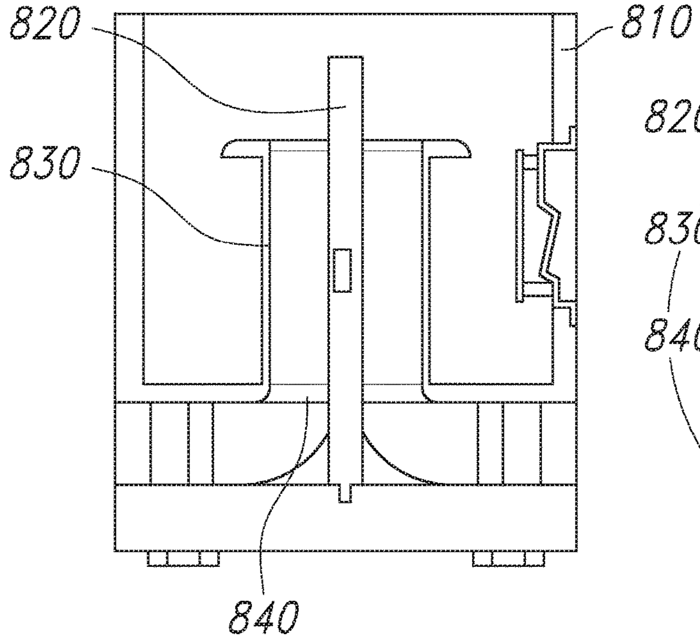
Figure 8C:
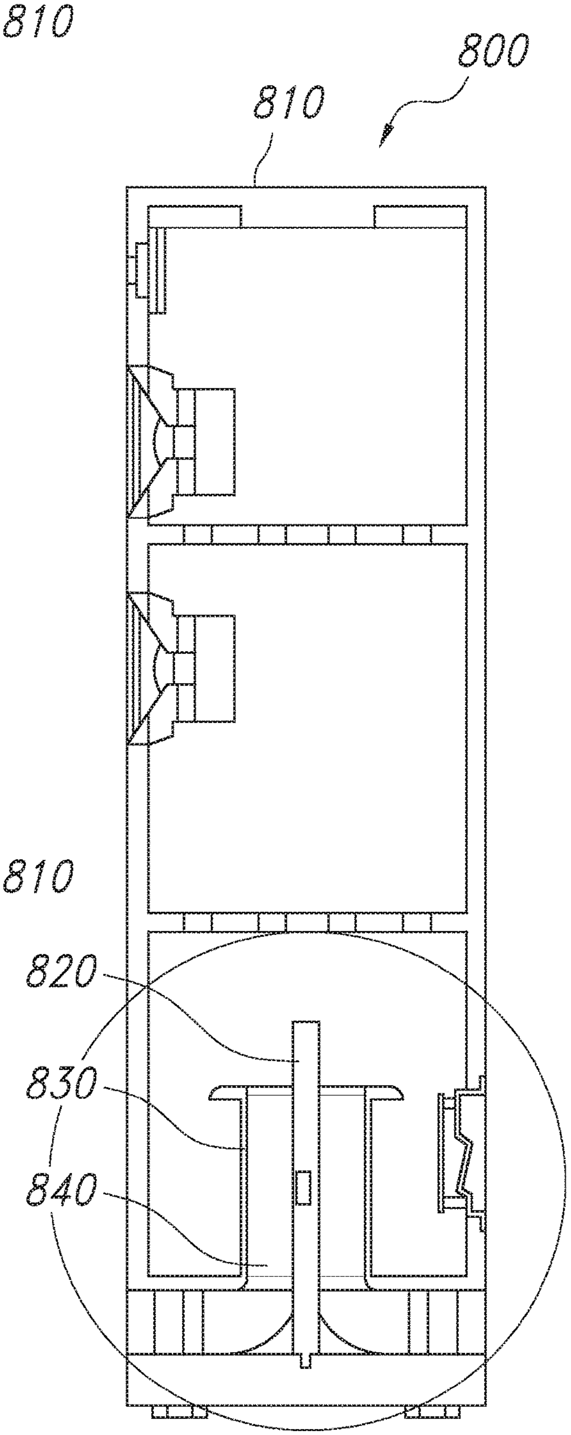

Referring next to FIGS. 3, 8A-8C and also to Figs 5A and 5B, the floor-standing or tower-sized embodiment of the ETF equipped loudspeaker system of the present invention 800 similarly includes a ported loudspeaker enclosure 810 having a front baffle which supports and aims at least one loudspeaker driver (e.g., a woofer, a mid-woofer and a tweeter) and a bottom baffle which supports the ETF assembly (e.g., 820). Ported tower loudspeaker enclosure 810 defines an interior volume ported to the ambient environment with a vent or port 830 which defines a cylindrical internal vent lumen 840 having a central vent lumen axis. ETF assembly 820 is supported in vent lumen 840 in coaxial alignment with the vent lumen axis and comprises a pipe or set of pipes or absorbers (850, 860) placed inside the loudspeaker vent lumen to absorb the "open pipe" acoustic resonance of the vent lumen 840 when the loudspeaker is in use. ETF assembly 820 (as seen in FIGS. 3 and 8B) has a proximal closed end cap opposite a distally, downwardly projecting end cap nested within a Power Port™ style diffuser and has, at its mid-point, a circumferential slot or sidewall gap which provides fluid communication between the interior volume of the first and second axially aligned ETF pipe segments or absorbers (850, 860) and the vent lumen 840.

Since the vent or port 830 defines a tuned port which provides fluid communication between the interior of enclosure 810 and the ambient environment, it also provides fluid communication between each of those and the interior volume of the ETF pipe for ETF Assembly 820. FIGS. 5A and 5B provide slightly different views of the ETF assembly 820 for use with tower system 800, showing the proximal, interior or upper end of the ETF pipe assembly carries a rounded or "bullet-nose" shaped end cap 870, preferably containing absorber elements (not shown). Referring back to FIG. 3, ETF assembly 820 has the proximal closed end cap opposite the distally, downwardly projecting end and has, at its mid-point, a circumferential slot or sidewall gap which provides fluid communication between the interior volume of the first and second axially aligned ETF pipe segments and the vent lumen 840. Each of the first and second axially aligned ETF pipe segments or absorbers (850, 860) preferably has an axial length that is substantially equal to one quarter wavelength for the frequency of interest (e.g., 150 mm for 494 Hz and 100 mm for 756 Hz) for a 38 mm ID.

Figure 9:
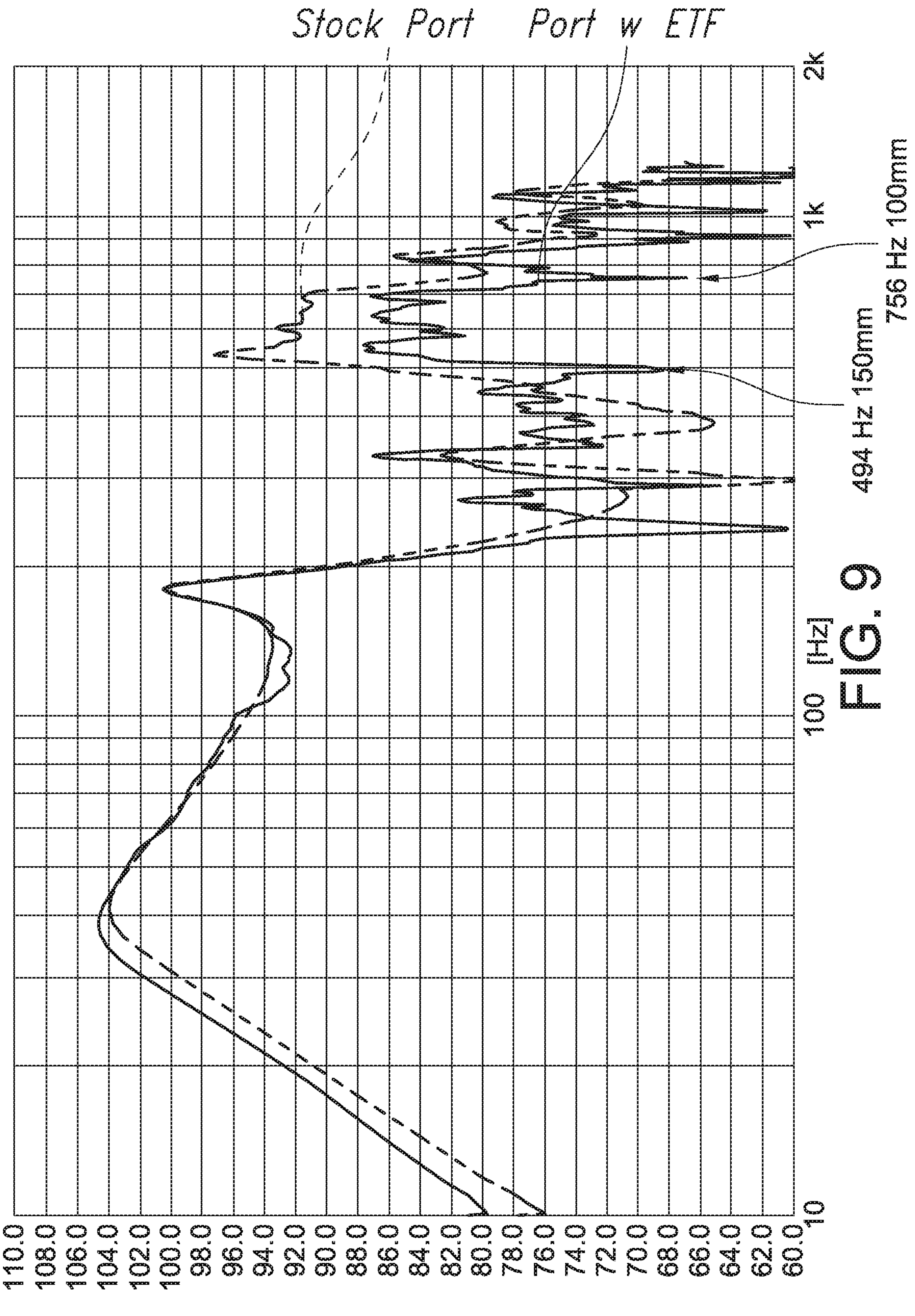
FIG. 9 is a frequency response plot illustrating the frequency responses for and performance of the stock (no ETF) and enhanced (Port with ETF) tower loudspeaker system of FIGS. 8A-8C, in accordance with the method of the present invention.

In the development method of the present invention, selecting the dimensions for (i.e., "tuning") the ETF pipes has been an iterative process. In the example of Tower loudspeaker system 800, The "stock port" data plotted in FIG. 9 shows an undesirable amount of energy in the range of 500 Hz to 750 Hz. In order to reduce or "notch out" this undesired energy with Tower speaker system ETF 820, the ETF pipe segments need to be properly sized and configured (or "tuned"). Initially estimating the speed of sound at 20 degrees Celsius to be 343 m/s, and using 100 mm provides quarter wavelength frequency of f=343/(0.1*4)=857.5 Hz. A 38 mm ETF pipe would add 0.3*38=11.4 mm in end correction (according to some references) changing the above to f=343/(0.1114*4)=769.7 Hz. Since it is not a completely open pipe, applicants have noted that this initial frequency tuning estimate might not be 100% accurate. Adding ~38 mm foam in the 100 mm ETF is believed to de-Q the pipe some and slow down the air velocity in the ETF some, thereby accounting for the change to 756 Hz in measured minimum difference curve, as shown in the "Port with ETF" data plotted in FIG. 9. Likewise the 150 mm tuning would be f=343/(0.15*4)=571.7 Hz, without end correction and f=343/(0.1614*4)=531.3 Hz, with end-correction, so after adding ~76 mm foam to 150 mm ETF, the frequency becomes f=494 Hz. As will be appreciated by those of skill in the art, this tuning does not appear to admit of a preliminary and exact calculation, because there is not a direct 1 to 1 relationship between the length and the ¼ wave frequency.

Since the ETF pipe assembly (e.g., 820) will tend to be smaller than that of the primary column, there needs to be a gap between the two absorbers (e.g., 850, 860) and, in the case of the Power Port embodiment illustrated in FIG. 3, the primary column which extends past the simple tube portion, the absorber assembly 820 tends to be longer than the assembly for the primary column (e.g., as shown in FIGS. 5A and 5B). This allows for the absorber assembly 820 to be mounted conveniently to the flare 880 at the ends of the main column or external to the main column.

The circumferential slot or sidewall gap opening (e.g., 755, 855) between the two axially aligned ETF pipe or tube shaped absorbers (e.g., 850, 860) influences the efficiency of the absorbers comprising the ETF assembly 820. If the slot or sidewall gap opening (e.g., 755, 855) is too small, the resonance absorbing effectiveness of the ETF absorber tubes diminishes. Preferably, the length of gap between and diameter of the absorbers is selected such that tube diameter is 1 to 1.25 times the length of gap between them (so, e.g. for a diameter of absorber=25 mm, the axial gap length between absorbers=20-25 mm).

The size of the absorber tubes influences the effectiveness of the absorbers. More cross-sectional area equates to better absorption. Since the absorbers subtract from the cross-sectional area of the main column (e.g., of vent or port 830), it is presently considered best to keep the absorbers as small as necessary to achieve the desired absorption. A ratio of 0.15 to 0.2 of absorber cross-sectional are to primary column (or vent lumen) cross-sectional area was determined to work best in prototype development. The Helmholtz tuning of the main column (e.g., vent 730 or 830) will change with the insertion of the absorber assembly since the cross-sectional area of the main column is reduced by the cross-sectional area of the absorber assembly. It is simple enough to increase the size of the main column (e.g., vent lumen 740 or 840) to compensate.

It is possible to tune the ETF assembly absorbers to absorb frequencies that are not necessarily caused by the primary air column (or vent lumen 740 or 840). For example, the resonances (modes) present in the loudspeaker cabinet frequently exit through the vent and can be absorbed by the absorbers if tuned properly. This has been demonstrated in the prototypes.

Having described preferred embodiments of a new and improved system and method, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. A method for tuning ported loudspeakers, comprising:

providing a loudspeaker system comprising a ported loudspeaker enclosure having a port opening and an interior volume, a driver supported by the ported loudspeaker enclosure, and a vent lumen associated with the port opening to provide fluid communication between the interior volume and an ambient environment, and substantially attenuating an open pipe resonance and improving a midrange performance of the loudspeaker system, said substantially attenuating and improving comprising providing the loudspeaker system with an Eigen Tone Filter ("ETF") structure extending in the vent lumen, the ETF structure comprising a first pipe segment, a second pipe segment substantially coaxially aligned with the first pipe segment, and a circumferential slot or a sidewall gap between the first and second pipe segments and positioned within the vent lumen.

2. The method of claim 1, wherein the first and second pipe segments have first and second pipe interior volumes, respectively, and wherein the circumferential slot or sidewall gap provides fluid communication between the vent lumen and the first and second pipe interior volumes.

3. The method of claim 2, wherein the first pipe segment has a first segment length, wherein the second pipe segment having has a second segment length, wherein the first segment length is approximately one quarter of a wavelength at a first selected ETF port signal notch frequency which is within a band of frequencies comprising an open pipe resonance of the vent lumen.

4. The method of claim 3, wherein said the second ETF pipe segment length is approximately one quarter of a wavelength at a second selected ETF port signal notch frequency which is within the band of frequencies comprising the open pipe resonance of the vent lumen.

5. The method of claim 4, further comprising selecting the first and second segment lengths, wherein said selecting is an iterative process.

6. The method of claim 5, wherein said selecting comprises:

plotting "stock port" data of the loudspeaker system to identify a frequency range having an undesired open pipe resonance energy; and selecting the first and second segment lengths to reduce or "notch out" the undesired open pipe resonance energy.

7. The method of claim 6, further comprising estimating the quarter wavelength frequency to determine an initial frequency tuning estimate.

8. The method of claim 7, further comprising adding foam material in the ETF structure to slow air velocity within the ETF structure.

9. The method of claim 1, wherein the driver comprises a midrange driver or a midbass driver, and wherein the loudspeaker system further comprises a baffle supporting the midrange driver or midbass driver.

10. A loudspeaker system, comprising:

a ported loudspeaker enclosure having a port opening and an interior volume;

a driver supported by the ported loudspeaker enclosure;

a vent lumen associated with the port opening to provide fluid communication between the interior volume and an ambient environment; and an Eigen Tone Filter ("ETF") structure extending in the vent lumen, the ETF structure comprising a first pipe segment, a second pipe segment substantially coaxially aligned with the first pipe segment, and a circumferential slot or a sidewall gap between the first and second pipe segments and positioned within the vent lumen.

11. The loudspeaker system of claim 10, wherein the first and second pipe segments have first and second pipe interior volumes, respectively, and wherein the circumferential slot or sidewall gap provides fluid communication between the vent lumen and the first and second pipe interior volumes.

12. The loudspeaker system of claim 11, wherein the first pipe segment has a first segment length, wherein the second pipe segment has a second segment length, and wherein the first segment length is approximately one quarter of a wavelength at a first selected ETF port signal notch frequency which is within a band of frequencies comprising an open pipe resonance of the vent lumen.

13. The loudspeaker system of claim 12, wherein the second segment length is approximately one quarter of a wavelength at a second selected ETF port signal notch frequency which is within the band of frequencies comprising the open pipe resonance of the vent lumen.

14. The loudspeaker system of claim 13, wherein:

the ported loudspeaker enclosure comprises a front baffle supporting and aiming at least one loudspeaker driver and a bottom baffle supporting the ETF structure;

the vent lumen comprises a cylindrical internal vent lumen having a central vent lumen axis along which the EFT structure is supported; and the ETF system has a proximal closed end cap and an opposite, distal downwardly projecting end cap nested within a diffuser.

15. The loudspeaker system of claim 14, wherein:

the ETF structure has a rounded or "bullet-nose" shaped end cap.

16. The loudspeaker system of claim 15, wherein the first and second pipe segments have an axial length that is substantially equal to 150 mm.

17. The loudspeaker system of claim 15, wherein the first and second pipe segments have an axial length that is substantially equal to 100 mm.

18. The loudspeaker system of claim 10, wherein the ETF structure is substantially coaxially aligned with the vent lumen and has an inside diameter in a range of 25 to 38 mm.

19. The loudspeaker system of claim 10, wherein a length of the sidewall gap between the first and second pipe segments is in a range of 1 to 1.25 times a diameter of the first and second pipe segments.

20. The loudspeaker system of claim 10, wherein the driver comprises a midrange driver or a midbass driver, and wherein the loudspeaker system further comprises a baffle supporting the midrange driver or midbass driver.

* * * * *